UNITED STATES PATENT OFFICE.

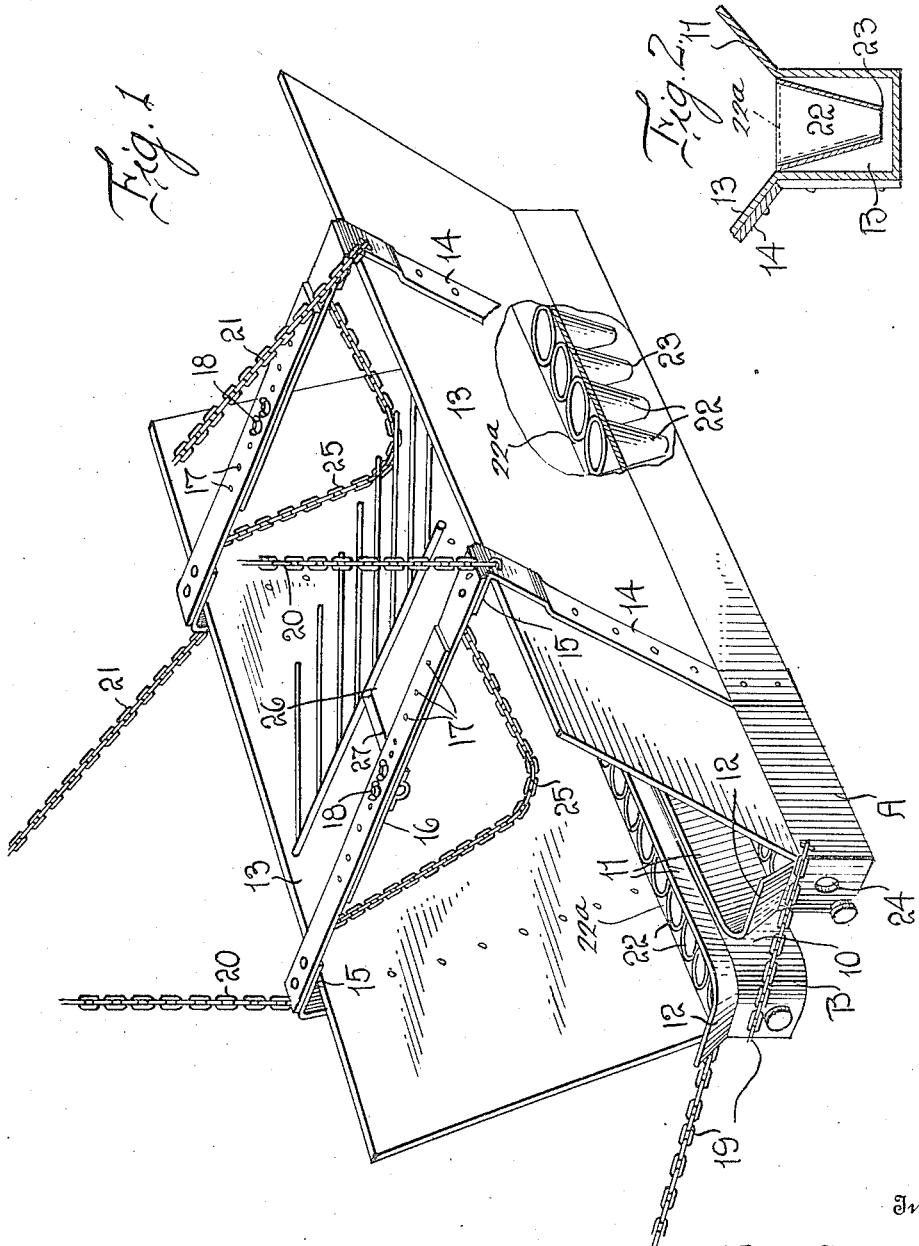

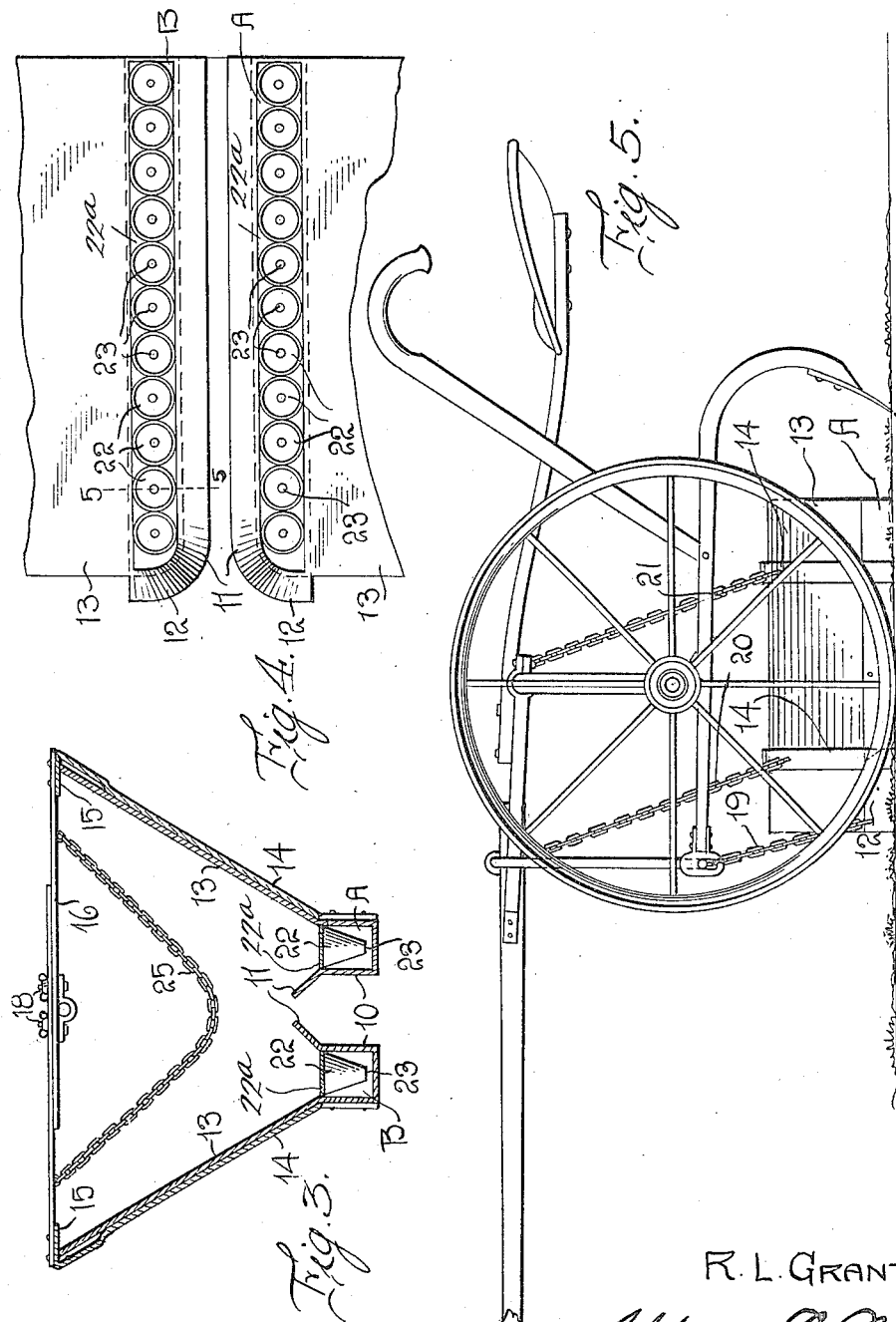

ROBERT L. GRANT, OF GRADY, OKLAHOMA.

BOLL-WEEVIL CATCHER.

1,232,679. Specification of Letters Patent. Patented July 10, 1917.

Application filed January 22, 1917. Serial No. 143,713.

*To all whom it may concern:*

Be it known that I, ROBERT L. GRANT, a citizen of the United States, residing at Grady, in the county of Jefferson and State of Oklahoma, have invented certain new and useful Improvements in Boll-Weevil Catchers, of which the following is a specification, reference being had to the accompanying drawings.

This invention relates to agricultural implements and particularly to devices for trapping boll weevils and other insects.

The general object of my invention is the provision of a very simple, cheap and easily applied boll weevil catcher so constructed that it may be attached to a cultivator and drawn behind the cultivator and further so constructed that the troughs which form the traps into which the boll weevils are brushed may be adjusted nearer to or farther from each other.

A further object of the invention is to provide a boll weevil catcher so constructed that oil need not be used with it in order to trap the insects and in this connection to provide trapping troughs adapted to run on each side of a row of plants, these trapping troughs being provided with funnel-shaped inlet walls terminating above the bottom of the trough so that insects knocked into the trough cannot readily climb out therefrom.

Other objects will appear in the course of the following description.

My invention is illustrated in the accompanying drawings, wherein—

Figure 1 is a perspective view of a boll weevil catcher constructed in accordance with my invention;

Fig. 2 is a transverse sectional view through one of the troughs and its trapping funnel;

Fig. 3 is a transverse sectional view through the two troughs, the section being taken forward of the forward brace 14;

Fig. 4 is a fragmentary top plan view of the troughs, the transverse braces being omitted; and Fig. 5 is a side elevation of a common form of riding cultivator showing my invention applied thereto.

Referring to these drawings, it will be seen that my invention contemplates the use of two troughs, designated generally A and B, disposed in parallel spaced relation to each other, each of these troughs being alike and each trough being made of sheet metal, as for instance sheet steel, closed at its sides and at its ends. Each trough is provided upon its front wall 10 with an upwardly and outwardly extending apron 11 and this apron is extended around upon the ends of the trough as at 12. The apron 11 forms a hopper in a sense, directing insects into the troughs. The outside wall of each trough is upwardly extended as at 13 to a suitable height, as for instance 18 inches, and attached to these upwardly extending walls are the vertical members or braces 14 which at their upper ends are provided with chains adapted to engage a cultivator frame as will be later stated. These braces 14 are preferably of sheet metal sufficiently strong to support the troughs and extend down on the exterior face of the extension 13 and the outer wall of the trough and are attached thereto in any suitable manner. Extending across the upper edges of the flaring side walls 13 are transversely extending braces 16 which may rest at their outer ends on the inwardly turned ends 15 of the braces 14. These braces 16 are provided with a plurality of perforations 17 and bolts 18 pass through these perforations, thus permitting the braces 16 to be shifted upon each other and adjusted to bring the troughs nearer to or farther from each other. Chains or other flexible connecting members 19 are attached to the forward ends of the troughs and, as illustrated in Fig. 5, extend upward to the front arch of the cultivator. Chains or other flexible connections 20 and 21 are attached to the braces 14 at their upper ends and extend upward and are connected respectively to the front and rear arch of the cultivator.

Each of the troughs A and B is formed with a top plate 22ª through which are disposed a plurality of funnels 22 which extend downwardly nearly to the bottom of the trough and terminate at their lower ends in the small openings 23. It will be seen that each funnel in connection with the trough forms a trap permitting the easy descent of the insect into the trough but preventing its exit therefrom. These funnels should be about one and three-quarter inches in depth while the opening 23 should be about one-quarter of an inch in diameter. One end of each trough is formed with an opening 24 closed by a removable plug and the weevils caught in the trapping troughs may be discharged through these openings when the plugs are removed.

The troughs are to be adjusted as close to the row as possible and the aprons or wings 11 will extend inward toward the stalks of the plants so that any weevils knocked from the plants will fall upon the inclined aprons and will be guided into the trapping troughs.

Any suitable means may be provided for knocking the insects on the plants into the trough. In some cases the transverse braces will form means which will perform this function but where the plants are small it is preferable to provide hanging chains 25 which will act to shake the plants and knock the insects into the troughs. I may also provide for this purpose the rearwardly and downwardly extending forks designated generally 26, the fork having a shank 27 connected to the forward brace in any suitable manner and having downwardly and rearwardly extending tines about 14 inches in length. These tines will strike the branches of the plants and shake them sufficiently to dislodge the insects.

It will be seen that by connecting the catcher to the cultivator by means of chains, the trough is permitted to swing or to have such freedom of movement that it may follow along the row on each side of the plant stalks. It will be seen from Fig. 5 that this trough works in front of the plows or cultivator shovels and is not in the way and does not interfere in any manner with ordinary plowing or cultivating. The insects knocked into the troughs fall downward through the several funnels and into the bottoms of the troughs and they cannot escape therefrom but these insects may be poured out of the troughs by removing the plugs from the openings 24.

While I have illustrated the form of my invention which I have found to be very cheap in construction and very easily applied and detached, I wish it understood that it may be modified in many ways without departing from the spirit of the invention as defined in the appended claims.

Having described my invention, what I claim is:

1. A boll weevil catcher including parallel spaced troughs, each of said troughs having an outer wall extending outward and upward above the upper edge of the trough, and an inner wall and end walls extending upward and laterally, and a plurality of funnels extending across the trough, the lower ends of the funnels being open, and means adjustably connecting the troughs and spacing them from each other.

2. A boll weevil catcher comprising parallel troughs, each trough having an inner upwardly and laterally extended wall and upwardly and outwardly extending end walls, the outer wall of each trough above the trough being upwardly and outwardly extended and extending a considerable distance above the upper edge of the inner wall, braces extending upward on the outer wall, transverse braces formed in two sections connected to said first named braces and extending transversely, said transverse braces being formed with a plurality of perforations and having their sections overlapped and adjustably connected to each other, chains attached to said upwardly extending braces, chains attached to the forward ends of the troughs, and plant shaking devices mounted upon said transverse braces.

In testimony whereof I hereunto affix my signature in the presence of two witnesses.

ROBERT L. GRANT.

Witnesses:
W. M. ARMSTRONG,
J. G. YEUTH.